United States Patent
Laurbak

[11] Patent Number: 5,947,015
[45] Date of Patent: Sep. 7, 1999

[54] MASSAGE PLANT FOR MEAT

[75] Inventor: Kristen Laurbak, Aalborg SØ, Denmark

[73] Assignee: Scanio A/S, Aalborg, Denmark

[21] Appl. No.: 08/952,408

[22] PCT Filed: May 20, 1996

[86] PCT No.: PCT/DK96/00221

§ 371 Date: Nov. 13, 1997

§ 102(e) Date: Nov. 13, 1997

[87] PCT Pub. No.: WO96/36233

PCT Pub. Date: Nov. 21, 1996

[30] Foreign Application Priority Data

May 19, 1995 [DK] Denmark .................................. 0580/95

[51] Int. Cl.⁶ .............................. A23L 1/00; A23L 1/31; A22C 9/00; A22C 17/00
[52] U.S. Cl. .............................. 99/535; 99/472; 99/517; 366/139; 366/228; 426/281; 426/518; 426/614; 452/141
[58] Field of Search .............................. 99/348, 472, 486, 99/487, 494, 516, 517, 534, 535; 68/208, 146, 23.1, 140; 69/30; 165/88; 366/57, 144, 139, 147, 227, 185, 337, 233, 228, 239; 452/141–143; 426/641–643, 519, 518, 520, 524, 523, 266, 281, 332, 331, 480, 513, 614

[56] References Cited

U.S. PATENT DOCUMENTS

| | | | |
|---|---|---|---|
| 3,934,860 | 1/1976 | Michels et al. ........................ | 99/535 X |
| 4,038,426 | 7/1977 | Jespersen et al. ................... | 426/641 X |
| 4,356,762 | 11/1982 | Langen ...................................... | 99/533 |
| 4,432,650 | 2/1984 | Langen et al. .......................... | 366/197 |
| 4,446,779 | 5/1984 | Hubbard et al. ......................... | 99/472 |
| 4,498,378 | 2/1985 | Norrie et al. ........................ | 99/348 X |
| 4,517,888 | 5/1985 | Gould .................................. | 366/139 X |
| 4,522,118 | 6/1985 | Simonsen et al. ................... | 99/535 X |
| 4,785,728 | 11/1988 | Miyata et al. ............................ | 99/535 |
| 4,836,099 | 6/1989 | Thirode ............................. | 366/233 X |
| 4,994,294 | 2/1991 | Gould . | |
| 5,323,694 | 6/1994 | Higashimoto ........................ | 99/487 X |
| 5,492,499 | 2/1996 | Van Haren et al. ................ | 426/641 X |
| 5,564,332 | 10/1996 | Ludwig .................................... | 99/472 |

FOREIGN PATENT DOCUMENTS 157595 4/1982 Denmark .
643918 3/1995 European Pat. Off. .

Primary Examiner—Timothy F. Simone
Attorney, Agent, or Firm—Watson Cole Grindle Watson, P.L.L.C.

[57] ABSTRACT

A massage plant for the processing of chunks of meat includes a container (22) which is rotatable about its longitudinal axis and includes axially or substantially axially extending interior conveyors (16), each made as a hollow profile containing internal channels. Each conveyor is preferably produced by securing a sheet by means of embossments (e.g., temp-plates or vortex plates), in such a manner that a space is generated between the sheet and the hollow profile which has a connection (42,46) for a fluid for regulating the temperature of the load of meat and brine in the container. The axial orientation of the conveyors makes the entire interior of the container easy to survey. The construction of the conveyors is furthermore comparatively simple, and in the event of a leakage, the valuable meat contained in the container is not contaminated by the fluid, since the spilled matter runs within the hollow profile where it is possible to detect any spillage.

9 Claims, 5 Drawing Sheets

MASSAGE PLANT FOR MEAT

BACKGROUND OF THE INVENTION

1. Field of The Invention

The present invention relates to a massage plant for the processing of chunks of meat and of the type that comprises a rotatable container provided with conveyors with flow paths for a fluid for adjusting the temperature of the container contents.

2. The Prior Art

Massaging plants for the processing of meat chunks by massaging brine into the meat is well known, cf. e.g., WO 89/08982 and GB-A 2 085 742 and EP-B 0 127 608.

During the mechanical massaging process, a fairly substantial amount of heat is generated, and the ambient temperature also heats up the meat. In order to counteract such heating, the containers are typically provided with a cooling jacket. On the outside of the cooling jacket, however, an ice layer is formed which is undesirable from a sanitary point of view. To avoid such ice layer formation the container is in some cases provided with an external insulation. In addition to increasing the cost of and complicating the construction, the insulation is also undesired for veterinary reasons. Another way of keeping the meat chilled is by means of vacuum and evaporation of an inert gas in the container. It goes without saying that it is not always desirable to use a gas in direct contact with the meat. Moreover the operation of the plant is not without difficulty, and the construction in itself makes comparatively severe requirements. To avoid these problems, it has even been attempted to encapsulate the entire plant in an insulated cabinet, which obviously not only is cost-raising but also complicates the operation procedure, since access to the plant is restricted by a door in the cabinet.

However, one plant with conveyors in the form of two oppositely oriented spiralling vanes is known, cf. GB-A 2 085 742, wherein the further development described U.S. Pat. No. 4,994,294 performs a chilling operation by circulating a coolant through a labyrinth in the spiralling vanes.

However, there are several aspects to the case, such as cleaning and inspection of the container, which are difficult in case of a container with spiralling vanes since inaccessible surfaces exist behind the turns.

In order for the container to obtain the desired degree of loading, the size of the container opening is usually very small, which complicates the cleaning and inspection. In some cases the containers are even arranged in an inclined position to obtain adequate loading, cf. U.S. Pat. No. 4,994, 294 whereby the frontmost portion of the container remains fairly inoperative during the massaging process since the meat will collect at the bottom of the container.

SUMMARY OF THE INVENTION

The invention provides a massage plant wherein the container is provided with axially extending or substantially axially extending conveyors, the cavities of which contain one or more separate channels on or adjacent to their inner surfaces for the conveyance of the temperature-adjusting fluid. This provides a simple and also very effective construction. Any leakage of fluid will occur inside the conveyor cavity where it may be detected, and not into the container's load of meat and brine which would otherwise be ruined. Moreover, all interior surfaces of the container are readily visible when inspection is to be carried out of the cleaning which is in itself more easily performed when the conveyors extend axially.

The channels may be conduits or sheet elements attached directly to the conveyors, or they may be in the form of an insert. According to a particularly preferred solution, the temp-plate elements known per se are used or vortex sheets (in the following jointly designated temp-plate elements).

Temp-plate elements are used for performing a wide variety of tasks within the heating/cooling technology for a wide variety of applications, e.g., for the slaughtering and brewing industries, for the dairy sector and for the chemotechnical industry. The temp-plate elements consist of two sheet components with spaces between close positioned point joinings. In one type spot weldings are performed whereupon pressure is applied to the temp-plate element causing bulgings to occur between the spot weldings. According to another design, the sheets are pre-embossed with locking of circular openings and they are welded at their periphery. According to one embodiment of the invention, the side of the massaging vane constitutes the one sheet component of the temp-plate element whereby as close a thermal contact with the the container interior as possible is established. Stainless steel, commonly used for the containers, does not possess particularly good thermal conductivity -which is why good contact with the massaging vanes is necessary.

According to a particularly simple embodiment the massaging vane has two planar lateral surfaces between which the medium is conveyed forwards at the one side and returned at the other. At the rear of the container, a distribution manifold for the conveyors is provided which means that the interior of the container is free except for the conveyors.

In a method of operating a massage plant according to the invention, coolant as well as heating medium may be conveyed to the massaging vane thereby imparting to the load the optimum starting temperature for the process.

One embodiment of the invention will now be explained in further detail with reference to the accompanying drawings.

DETAILED DESCRIPTION OF THE PREFERRED EMBODIMENTS

Figure 1:
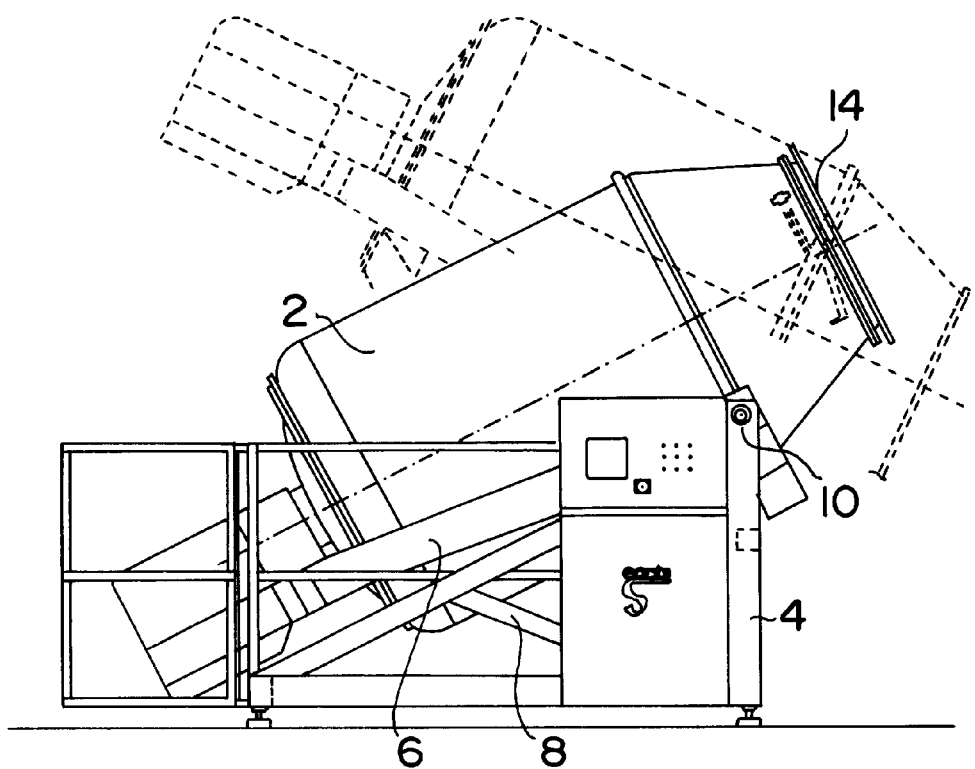
FIG. 1 is an elevational side view of the massager.
Figure 2:
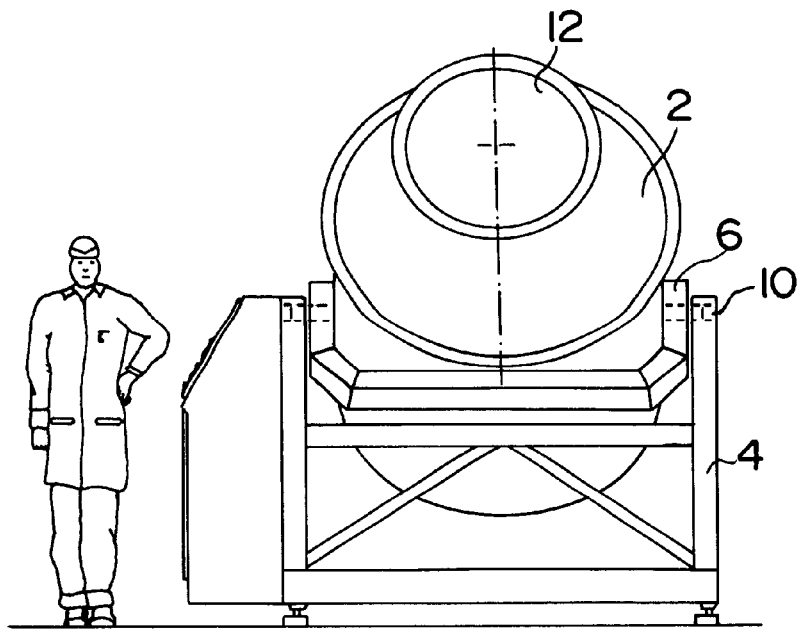
FIG. 2 is a front view of the massager.

As will appear from FIGS. 1 and 2 of the drawings, the massage plant includes a container 2 which is secured to be rotatable about its longitudinal axis and tiltable in a rack 4 over an intermediate frame 6.

By means of a hydraulic cylinder 8 at each side, the intermediate frame with the container may be tilted around an axis 10. The container opening 12, which may be hermetically closed by means of a cover 14, is enlarged whereby the loading and unloading operations are facilitated, and so is the cleaning. It will be appreciated that the container may occupy three positions, viz. a backwardly tilted filling position which enables a high degree of filling despite the large container opening 12 (solid line depiction in FIG. 1), a horizontal position (not depicted) in which the container rotates and exercises the massaging process, and a forwardly tilted discharge position (indicated by the dotted line in FIG. 1).

Figure 3:
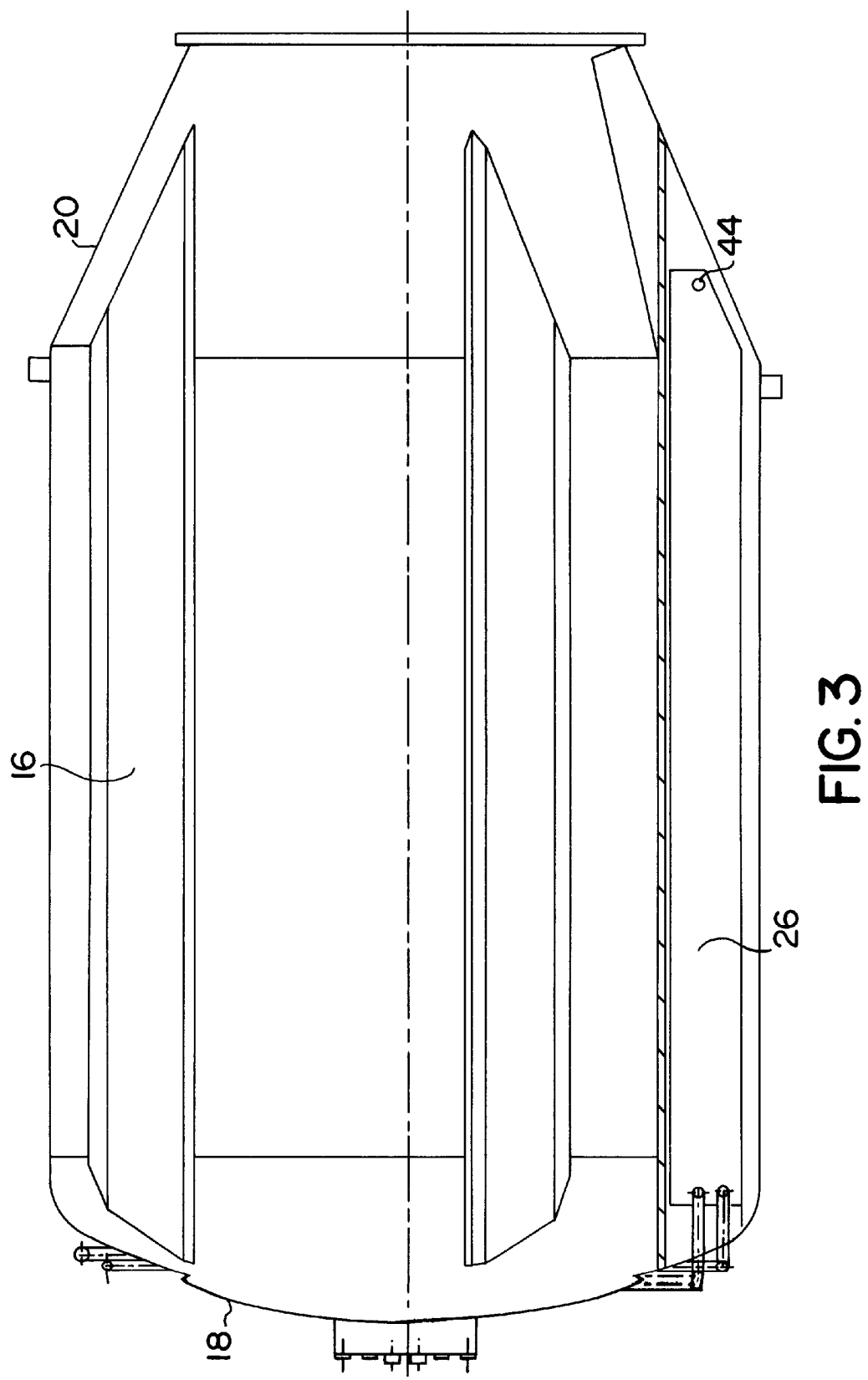
FIG. 3 is a longitudinal sectional view of the container.

For tumbling the meat, the container interior is provided with conveyors 16 which extend parallel with the rotational axis of the container as will appear from the longitudinal sectional view of the container shown in FIG. 3. The conveyors 16 extend the entire container length from the bottom 18 at the rear to the conical tapering section 20 at the front. Apart from this, the container interior is completely smooth and all surfaces are readily visible through the enlarged container opening-which also serves to alleviate the cleaning operation.

Figure 4:
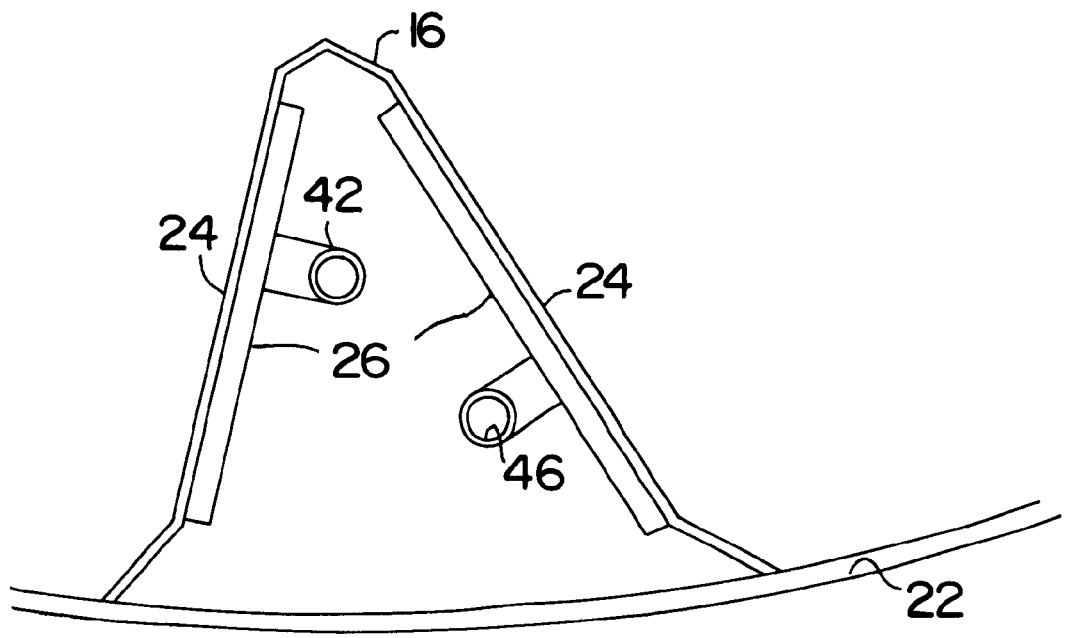
FIGS. 4,5 are sectional views through the conveyors, the view of FIG. 5 being taken at the conical tapering section.
Figure 5:
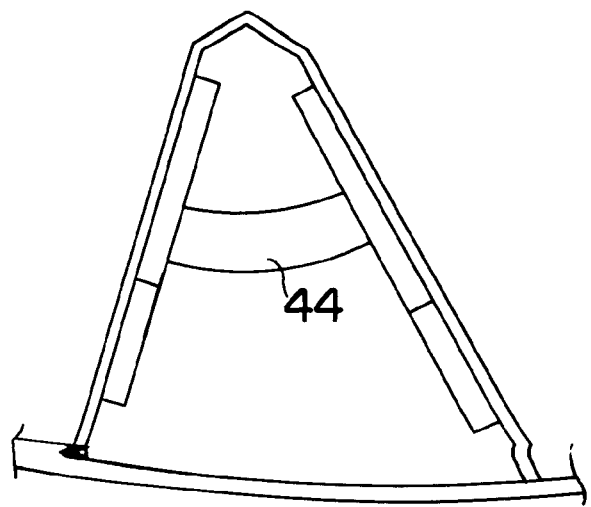
Figure 6:
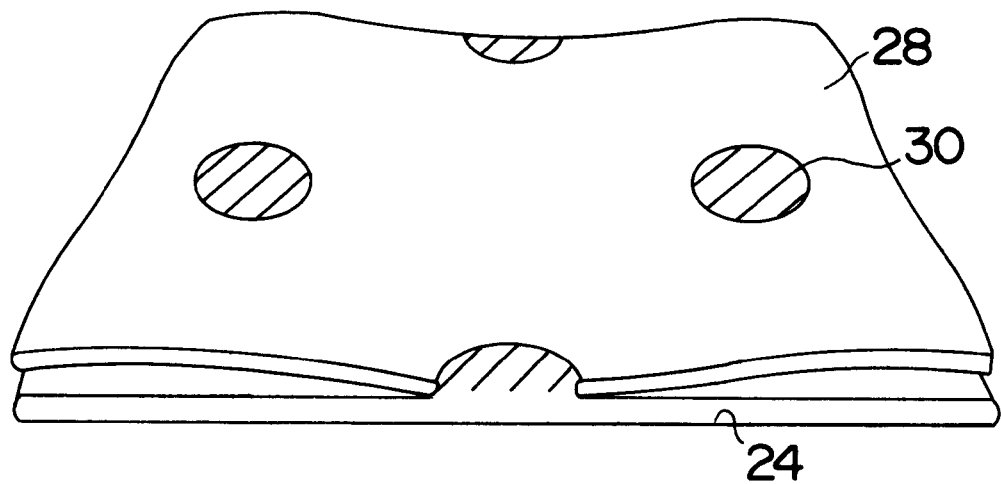
FIGS. 6,7 are sectional views of two different embodiments of temp-plate elements.
Figure 7:
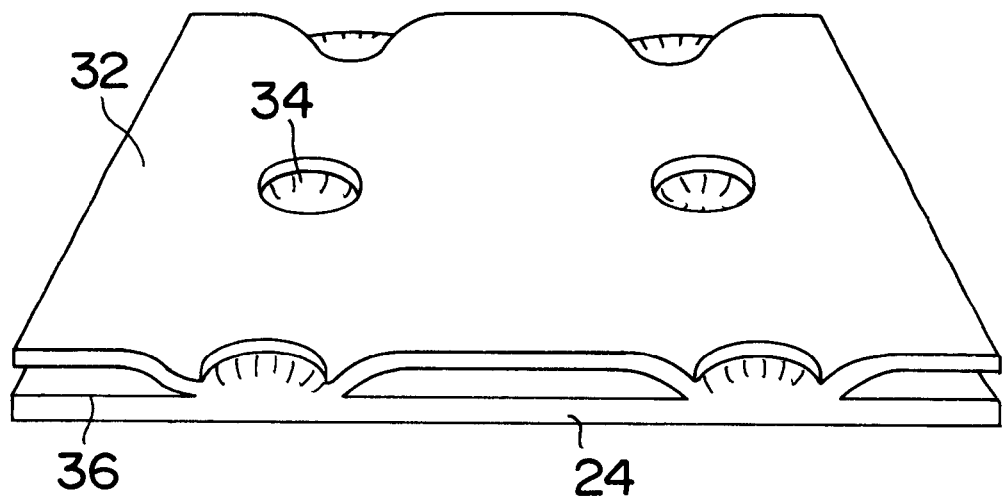

The massaging vanes are constructed in accordance with the sectional views in FIGS. 4 and 5, i.e., they are made of bent sheet components whose edges are fully welded onto the inside of the container jacket 22. As will appear, the conveyors have two planar lateral surfaces 24, to the insides of which a so-called temp-plate 26 element is secured to form a channel for the conveyance of a coolant or heating medium for regulating the temperature conditions in the container interior. The temp-plate elements extend across the entire or substantially the entire length of the conveyors. In FIGS. 6 and 7 of the drawing, two examples of temp-plate elements are given, the first exemplifying a sheet 28 spot-welded in points 30 to produce a uniform pattern on the inside of the conveyor, and fully welded along the edges. Subsequently a hydraulic pressure is applied between the sheets whereby the temp-plate element is caused to expand between the spot weldings to produce channels for the fluid between the spot weldings. In the alternative embodiment shown in FIG. 7, a pre-embossed sheet 32 with openings 34 is used. The sheet is welded onto the massaging vane in the rims of the opening—in both instances a coherent channel 36 is thus produced between the weldings. A comparatively large flow area is thus provided which makes it easier to adjust the temperature since a comparatively large amount of fluid may be conveyed therethrough.

Figure 8:
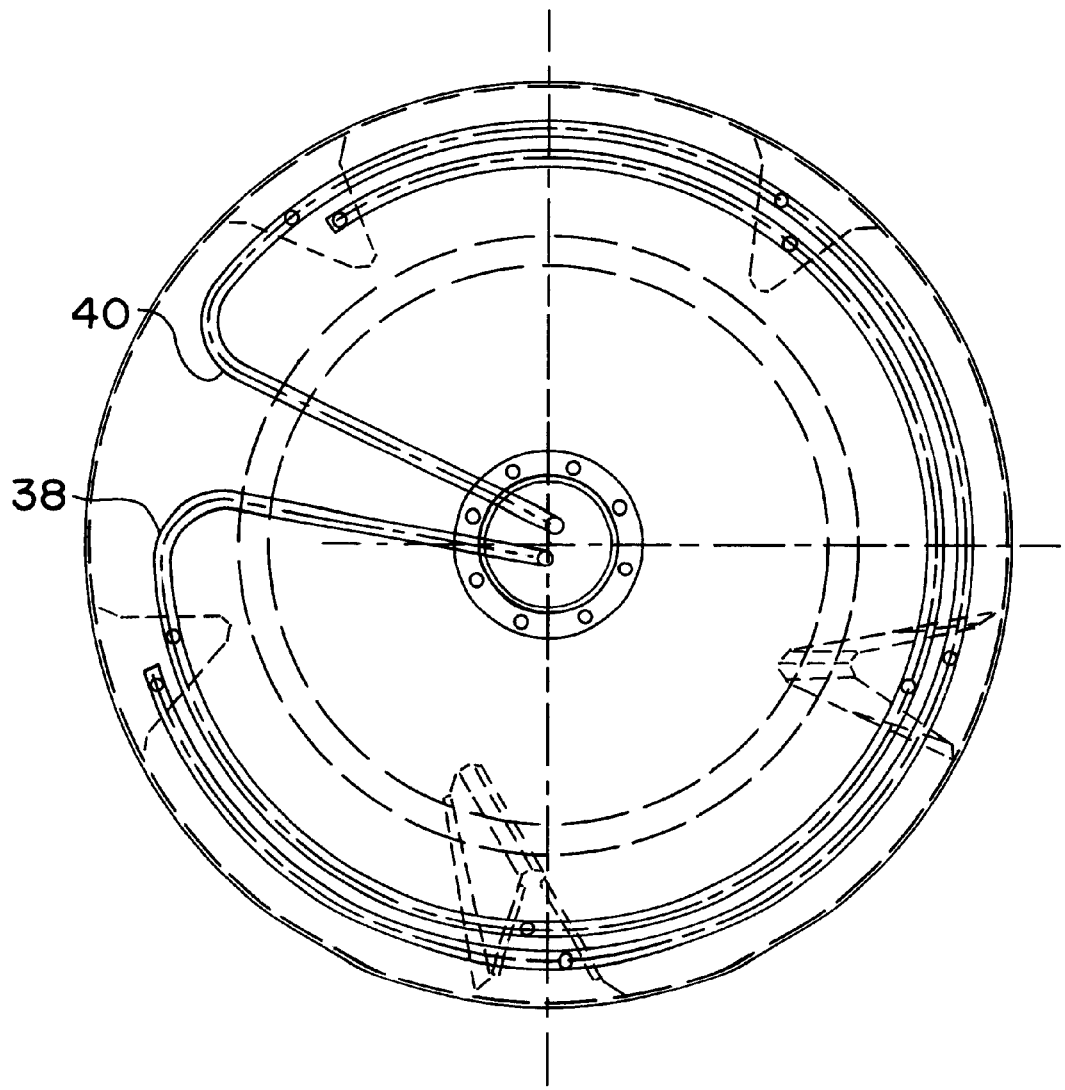
FIG. 8 is a rear end view of the container.

The fluid flow is additionally designed to have a supply flow at the one side of the conveyors and a return flow at the opposite side. In the container 18, two conduits 38,40 are provided which constitute the supply flow and the return flow, respectively, cf. FIG. 8. Through the end wall within the conveyor cross section, the supply flow 38 with connections 42 are connected to the one temp-plate element. At the front, the temp-plate element is connected to the temp-plate element at the opposite side of the conveyor by means of a connection 44 whereupon the fluid returns through the temp-plate element and transfers to the return flow 38 via a connection 46 in a manner corresponding to that of the supply flow.

The production of the massaging vanes is comparatively simple since the welding of the the temp-plate elements is carried out in the planar state of the component whereupon the profile of the massaging vane is generated by bending. It is a further advantage that the temp-plate elements may be pressure tested prior to welding of the massaging vanes in the container whereby it is ensured that no leaks occur in the finished construction.

As will appear, the construction is comparatively simple while retaining its efficiency, and a comparatively exact adjustment of the temperature may also be carried out. Typically, a chilling operation is performed, but if the temperature of the meat is too low for the desired process, heating may be effected by conveyance of a heating agent through the temp-plate elements.

Of course, the invention is not limited to using temp-plates; sheet elements with other kinds of point embossments, corrugated sheets or planar sheets of other labyrinth configurations may be used.

Thus, the invention provides an effective and simple construction, wherein an effective chilling may be carried out and wherein the option of heating is also available. More-over, the container is readily cleaned and easy to inspect.

I claim:

1. A massage plant for processing of chunks of meat comprising a container which is arranged rotatable about a longitudinal axis thereof and includes axially or substantially axially-extending interior conveyors defining a cavity containing at least one channel on or adjacent to an inner surface of a side wall thereof and through which a temperature-adjusting fluid can flow for adjusting the temperature of a load of meat and brine in the container.

2. A massage plant according to claim 1, wherein each said channel comprises a temp-plate element.

3. A massage plant according to claim 2, wherein a side wall of a temp-plate element provides a side wall of said conveyor.

4. A massage plant according to claim 3, wherein said conveyors define two interior planar surfaces onto which the temp-plate elements are mounted.

5. A massage plant according to claim 1, wherein said channels are arranged such that said fluid is conveyed in one direction at one side of the conveyors and returned at another side of the conveyors.

6. A massage plant according to claim 5, further comprising a distribution manifold for said fluid and connections to said channels, said connections extending through a bottom of said container within said conveyors.

7. A massage plant according to claim 6, wherein said manifold comprises two concentric conduits, one of which constitutes a supply conduit and the other a return conduit.

8. A massage plant according to claim 1, further comprising a cooling source for cooling of said fluid and a heating source for heating said fluid and a valve arrangement for switching between said cooling and heating source.

9. A method of operating a massager according to claim 1, wherein a coolant is conveyed through said channels in the conveyors for chilling the load to the desired temperature, alternatively that a heating medium is conveyed through said channels of the conveyors for heating the load until the desired temperature has been reached.

* * * * *